US009125514B1

(12) United States Patent
Rohrer

(10) Patent No.: US 9,125,514 B1
(45) Date of Patent: Sep. 8, 2015

(54) COOKING VESSEL WITH LID AND HANDLE DEVICE

(71) Applicant: Americraft Cookware, Inc., Mount Dora, FL (US)

(72) Inventor: Jeffrey S. Rohrer, Kewaskum, WI (US)

(73) Assignee: Americraft Cookware, Inc., Mount Dora, FL (US)

( * ) Notice: Subject to any disclaimer, the term of this patent is extended or adjusted under 35 U.S.C. 154(b) by 0 days.

(21) Appl. No.: 14/259,375

(22) Filed: Apr. 23, 2014

(51) Int. Cl.
*A47J 36/06* (2006.01)
*A47J 27/00* (2006.01)
*A47J 36/02* (2006.01)
*B65D 25/28* (2006.01)

(52) U.S. Cl.
CPC ............ *A47J 36/06* (2013.01); *A47J 27/002* (2013.01); *A47J 36/02* (2013.01); *B65D 25/2802* (2013.01); *B65D 2525/283* (2013.01)

(58) Field of Classification Search
CPC ....... A47J 27/0804; A47J 27/08; A47J 36/06; A47J 36/10; A47J 36/12; A47J 37/101; A47J 37/128; A47J 27/002; A47J 36/02; B65D 51/24; B65D 51/242; B65D 25/2802; B65D 43/24; B65D 43/164; B65D 43/163; B65D 43/16
USPC ........... 220/573.1, 912, 212.5, 212, 756, 832, 220/831, 810; D7/354; D9/443
See application file for complete search history.

(56) References Cited

U.S. PATENT DOCUMENTS

| | | | | | |
|---|---|---|---|---|---|
| 1,745,548 | A | * | 2/1930 | Lerner | 248/229.26 |
| 2,259,770 | A | * | 10/1941 | Nove | 220/379 |
| 2,705,657 | A | * | 4/1955 | Di Giorgio | 294/27.1 |
| 2,808,175 | A | * | 10/1957 | Aiken | 220/379 |
| 2,828,175 | A | * | 3/1958 | Barkules | 108/156 |
| 3,850,331 | A | * | 11/1974 | Oxel | 220/832 |
| D619,892 | S | * | 7/2010 | Welk et al. | D9/443 |
| 2007/0175895 | A1 | | 8/2007 | Vlahos | |
| 2008/0302806 | A1 | * | 12/2008 | Chen | 220/573.1 |
| 2012/0235003 | A1 | | 9/2012 | Turbes | |
| 2013/0284863 | A1 | | 10/2013 | Daniel | |

FOREIGN PATENT DOCUMENTS

| | | |
|---|---|---|
| EP | 0487534 B1 | 6/1994 |
| EP | 0998869 B1 | 2/2004 |
| WO | 9709915 A1 | 3/1997 |

* cited by examiner

*Primary Examiner* — Robert J Hicks
(74) *Attorney, Agent, or Firm* — Jansson Munger McKinley and Shape Ltd.

(57) ABSTRACT

A combination cookvessel and cookvessel-lid-and-handle device comprising a lid main portion having an offset handle member above the lid main portion. The offset handle member having a first end adjacent to and spaced above the lid edge, a gripping portion extending from the first end and over the lid main portion, a protrusion extending toward the lid main portion and engageable with the underside of the rim and a handle-connecting portion extending between the gripping portion and the lid main portion. The offset handle member suspends the cookvessel-lid-and-handle device on the rim above the open top of the cookvessel.

4 Claims, 5 Drawing Sheets

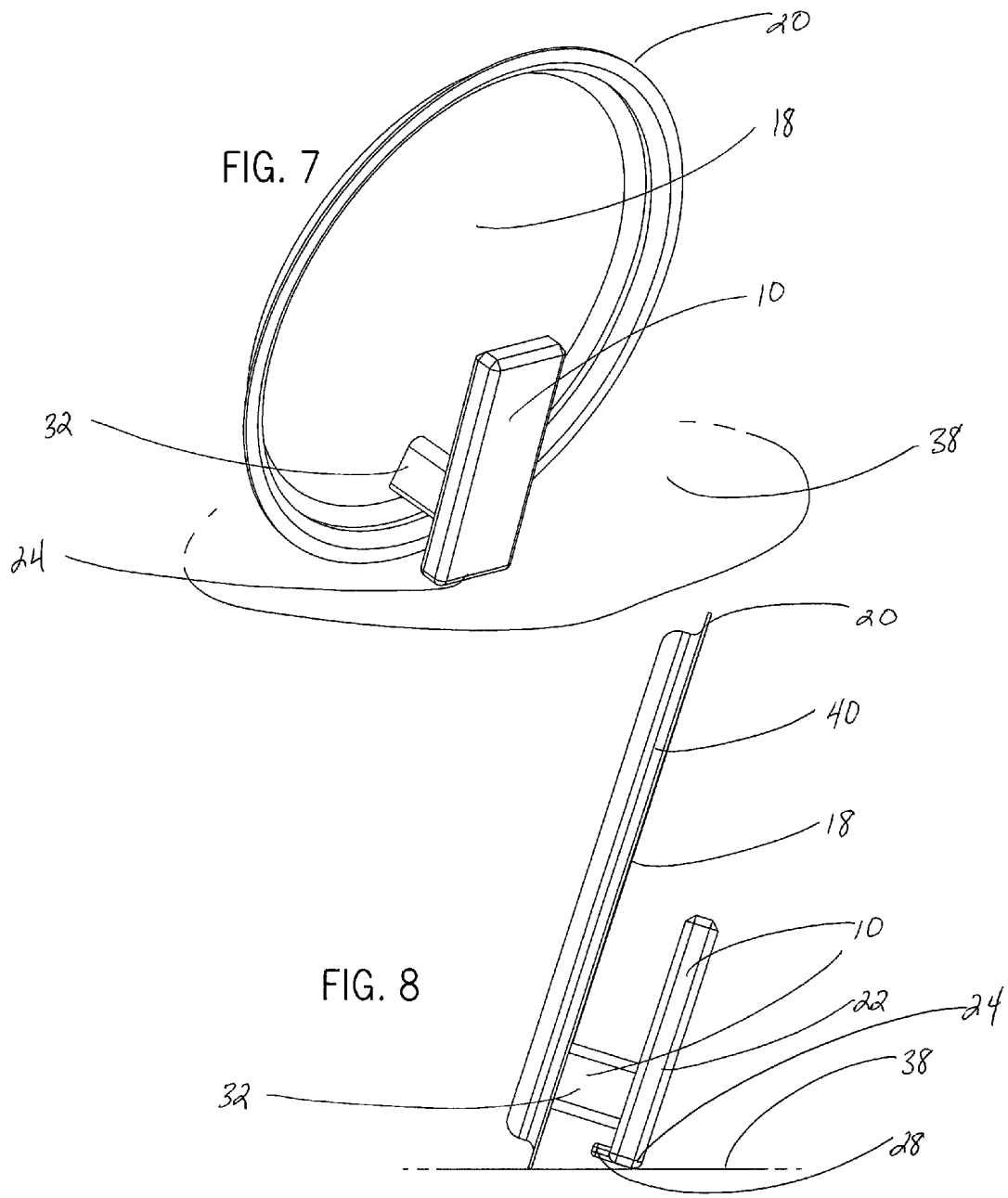

COOKING VESSEL WITH LID AND HANDLE DEVICE

FIELD

The present invention relates to a cooking vessel and more particularly to a combination cooking vessel with a lid and handle device.

BACKGROUND

Traditionally a lid is involved when cooking with a vessel such as a pot or pan. Very often it is desirable that the lid be lifted so that the user can access the contents of the vessel either for stirring, adding ingredients or a host of other reasons. Such a need may occur many times over the course of cooking a particular dish. When the lid is removed water that has condensed on the underside of the lid or other matter from the cooking food often collects and drips off the lid onto the counter or floor or whatever else is located below the lid. This causes a mess and can also result in the user being burned by a hot lid. Additionally, the user typically has one hand occupied with holding the lid while simultaneously stirring the vessel contents, adding ingredients, etc. Sometimes a user may set the hot lid on a counter top or other surface so that they have both hands available for cooking but doing so leaves a mess on the surface on which the lid was set and also does not protect the user or counter top from being burned by the hot lid.

Another problem arises when the user tries to balance the lid on a portion of the vessel to stir the contents of the vessel or add ingredients. Oftentimes the lid slides off of the vessel causing a mess and also possibly burning the user. All of this can make cooking messy and unnecessarily complicated.

It would be desirable to have a combination lid handle and holder that securely suspends the lid of a vessel in a position so that condensed water or any other matter that has collected on the underside of the lid can drip back into the vessel. It would be desirable to have a lid handle that can also function as a holder which could rest on a counter top or other surface in an upright manner for ease of use. Furthermore, it would be desirable to have a combination lid handle and holder that suspends a hot lid over a vessel so that the user does not have to hold onto the lid, thereby reducing the risk of the user being burned.

This device overcomes certain problems and shortcomings in the prior art, including those mentioned above and others, and provides advantages for a combination lid and utensil holder not previously provided.

SUMMARY

In accordance with the present device, in combination a cookvessel-lid-and-handle device and pot or pan, also referred to herein as a "cookvessel." The cookvessel-lid-and-handle device of this invention overcomes certain problems and shortcomings of the prior art and provides a unique structure satisfying needs in the cooking industry.

The combination includes a cookvessel having an open top surrounded by an outwardly projecting rim and a cookvessel-lid-and-handle device for temporary suspension above the open top of a cookvessel. The cookvessel-lid-and-handle device having a lid main portion having an edge and an offset handle member above the lid main portion and having (a) a first end adjacent to and spaced above the edge, (b) a gripping portion extending from the first end to a position over the lid main portion, (c) a protrusion extending toward the lid main portion and engageable with the underside of the rim (d) a handle-connecting portion extending between the gripping portion and the lid main portion. The offset handle member is configured to suspend the cookvessel-lid-and-handle device on the rim above the open top of the cookvessel.

In highly preferred embodiments, the protrusion is configured and positioned to suspend the lid in a first near-vertical orientation such that, when the cookvessel-lid-and-handle device is suspended over the open top of the cookvessel the edge of the lid defines a near-vertical plane and a portion of the edge is below the rim of the cookvessel. It is preferable that the handle-connecting portion is positioned to engage the top of the rim if the cookvessel-lid-and-handle device moves from its first near-vertical orientation toward a vertical orientation, thereby facilitating maintenance of first near-vertical orientation.

It is also highly preferred that the first end of the offset handle member and the adjacent edge of the lid main portion are configured and positioned to support the cookvessel-lid-and-handle device on a horizontal surface in a second near-vertical orientation which is beyond vertical with respect to the first near-vertical orientation.

Preferably, the offset handle member is formed of a heat-resistant plastic. In other preferred embodiments, the offset handle member is metal.

The term "cookvessel" as used herein means a pot or pan.

The term "utensil" as used herein means anything which is used to contact and manipulate food in the cookvessel, including but not limited to spoons, forks and spatulas.

As used herein, the term "above" as applied to the suspension of things related to the open top of a cookvessel means at a level higher than the top of the cookvessel.

As used herein, the term "over" as applied to the lid means immediately above the lid main portion but also including the space defined by the uppermost portion of the cookvessel.

BRIEF DESCRIPTION OF THE DRAWINGS

The drawings illustrate a preferred embodiment including the above-noted characteristics and features of the device. The device will be readily understood from the descriptions and drawings. In the drawings:

FIG. 7 is a perspective view of the cookvessel-lid-and-handle device of FIG. 1 without a vessel and resting on a horizontal surface.

FIG. 8 is a side view of the cookvessel-lid-and-handle device of FIG. 1 without a vessel and resting on a horizontal surface.

DETAILED DESCRIPTION

Figure 1:
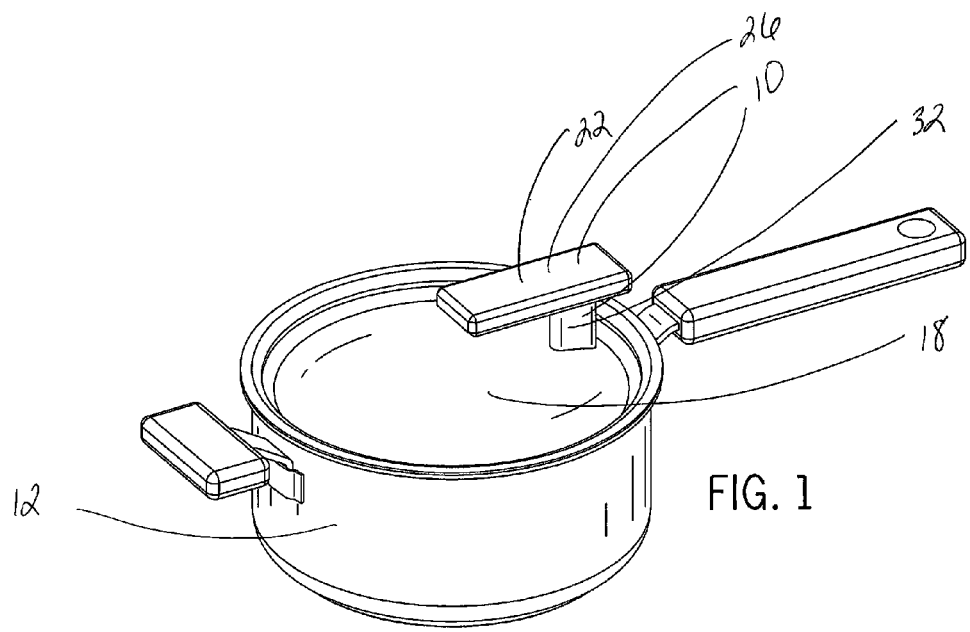
FIG. 1 is a perspective view of the cookvessel-lid-and-handle device attached to cookvessel.

Referring to FIGS. 1-8, a cookvessel-lid-and-handle device 10 in accordance with the present invention is generally designated by the reference numeral 10. FIGS. 1-8 illustrate a cookvessel 12 having an open top 14 surrounded by an outwardly projecting rim 16 in combination with cookvessel-lid-and-handle device 10 for temporary suspension above the open top 14 of a cookvessel 12.

Figure 5:
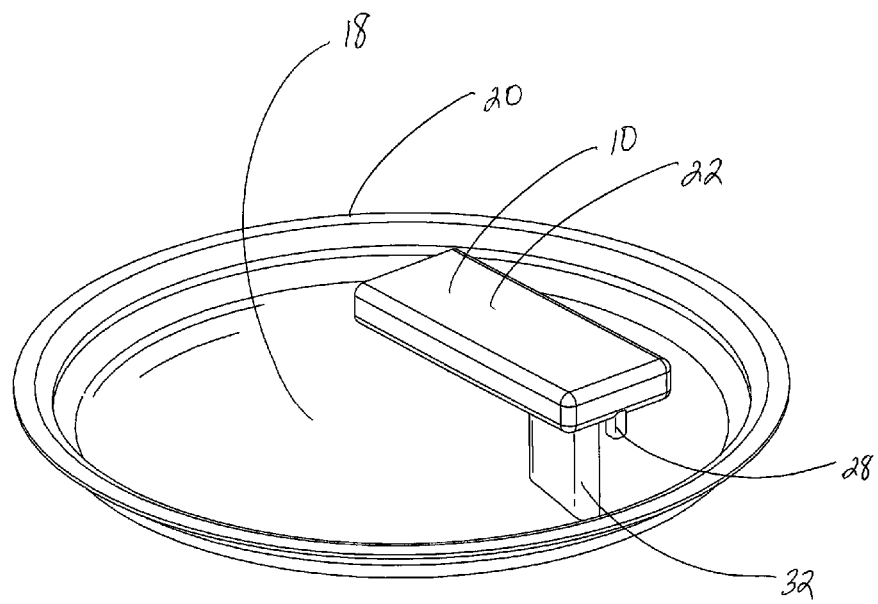
FIG. 5 is a top perspective view of the cookvessel-lid-and-handle device of FIG. 1 without a vessel.
Figure 6:
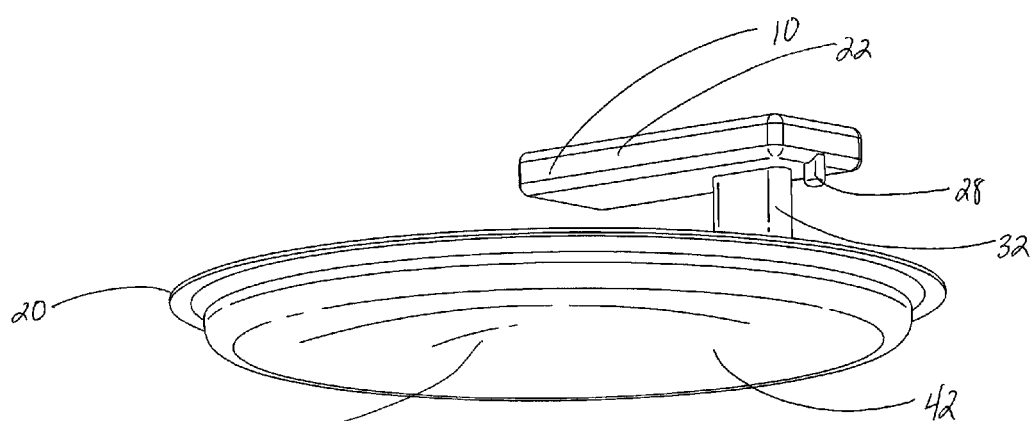
FIG. 6 is a bottom perspective view of the cookvessel-lid-and-handle device of FIG. 1 without a vessel.

FIGS. 1 and 5-6 illustrate that cookvessel-lid-and-handle device 10 includes a lid main portion 18 having an edge 20 and an offset handle member 22 above the lid main portion 18. Offset handle portion 22 has a first end 24 adjacent to and spaced above edge 20 and a gripping portion 26 extending from first end 24 to a position over lid main portion 18 as seen best in FIG. 1.

Figure 3:
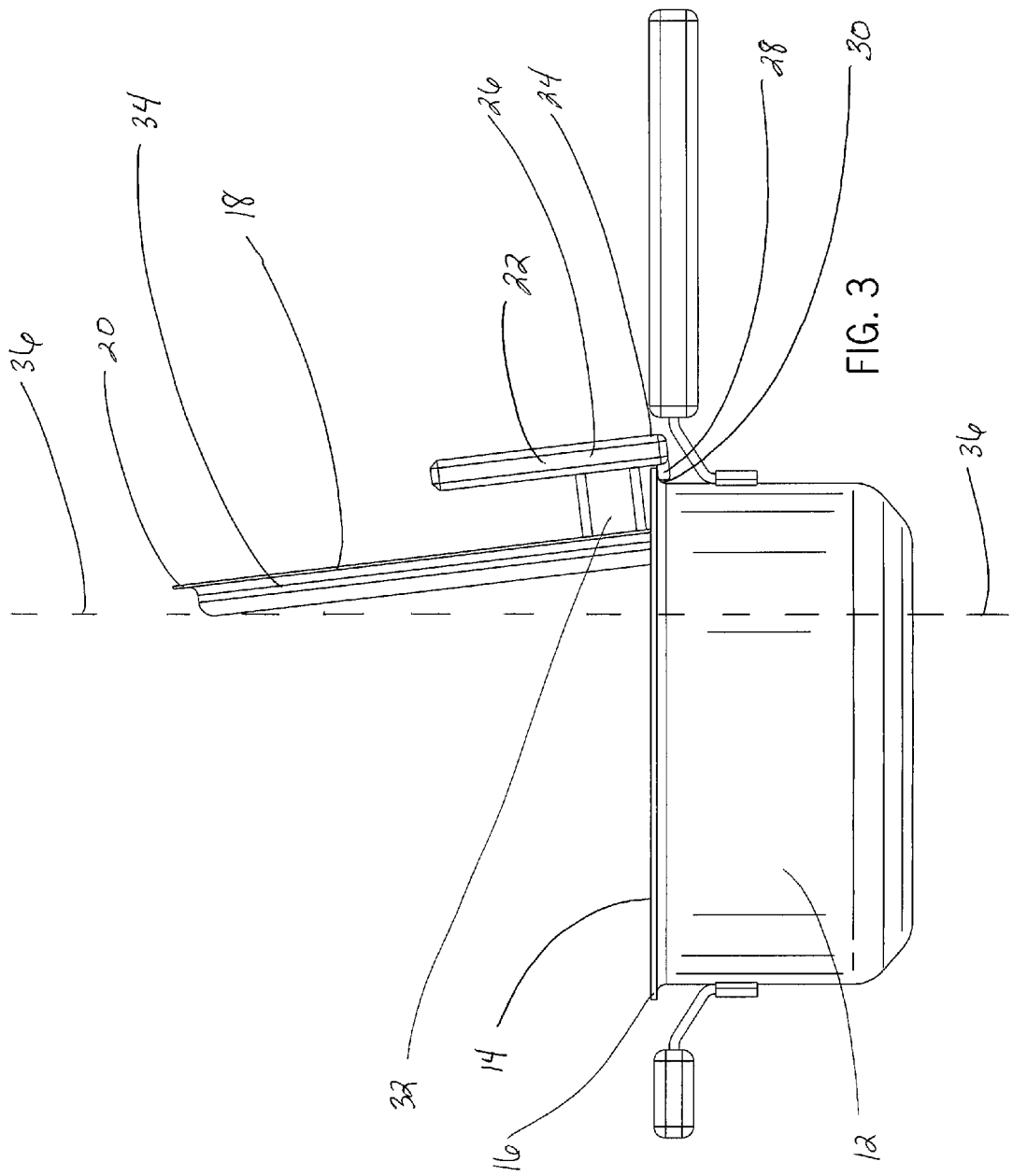
FIG. 3 is a side view of the cookvessel-lid-and-handle device and cookvessel of FIG. 1.
Figure 4:
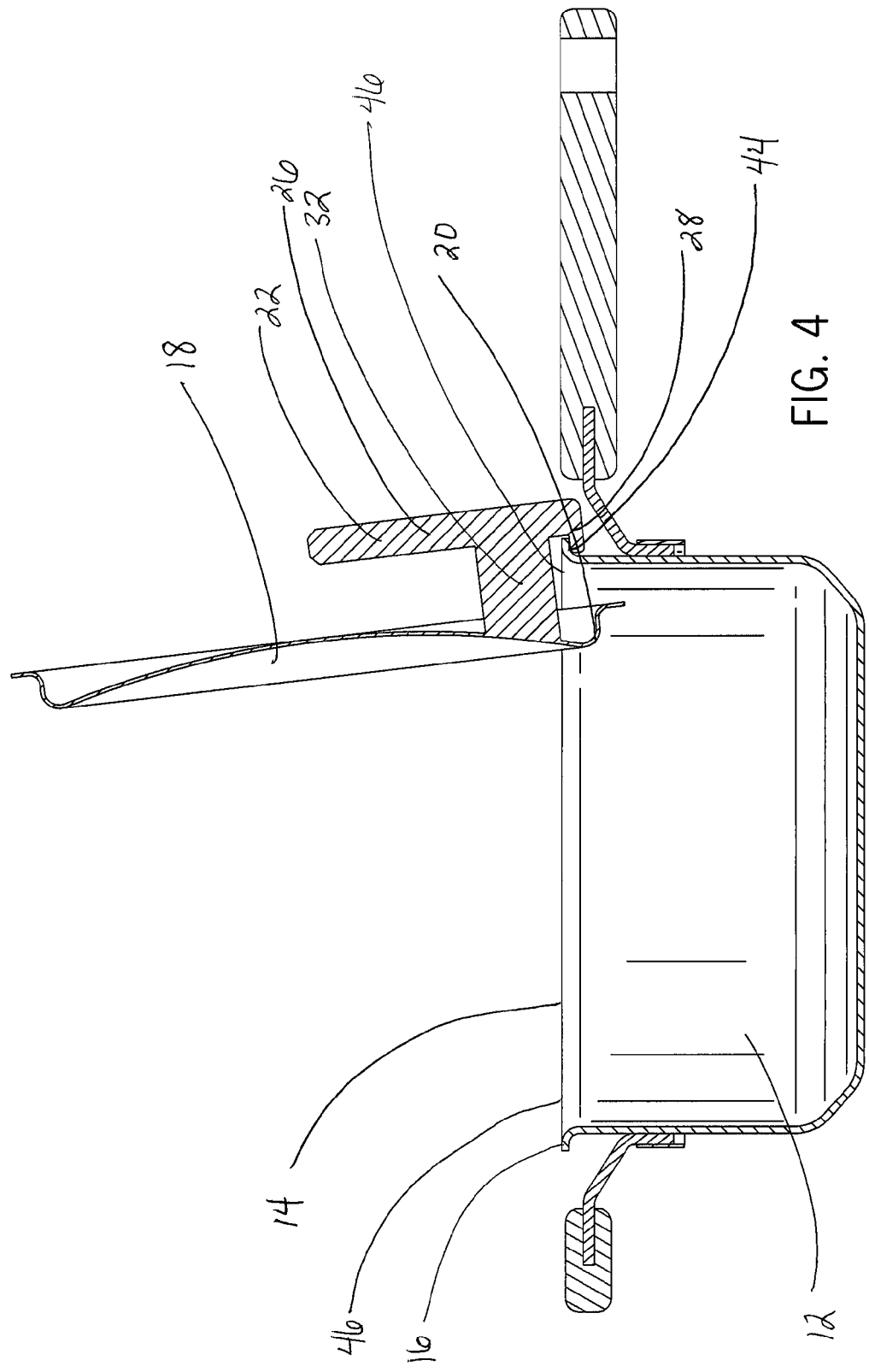
FIG. 4 is a further view of the cookvessel-lid-and-handle device and cookvessel of FIG. 2 taken in the direction of line 4-4.

FIGS. 5-6 illustrate that handle member 22 also includes a protrusion 28 extending toward lid main portion 18 and engageable with the underside of the rim 30. FIGS. 3-4 show in more detail the interaction between protrusion 28 and underside of the rim 30. Handle member 22 also includes a handle-connecting portion 32 extending between gripping portion 26 and lid main portion 18 as seen in FIGS. 1 and 3-8.

Figure 2:
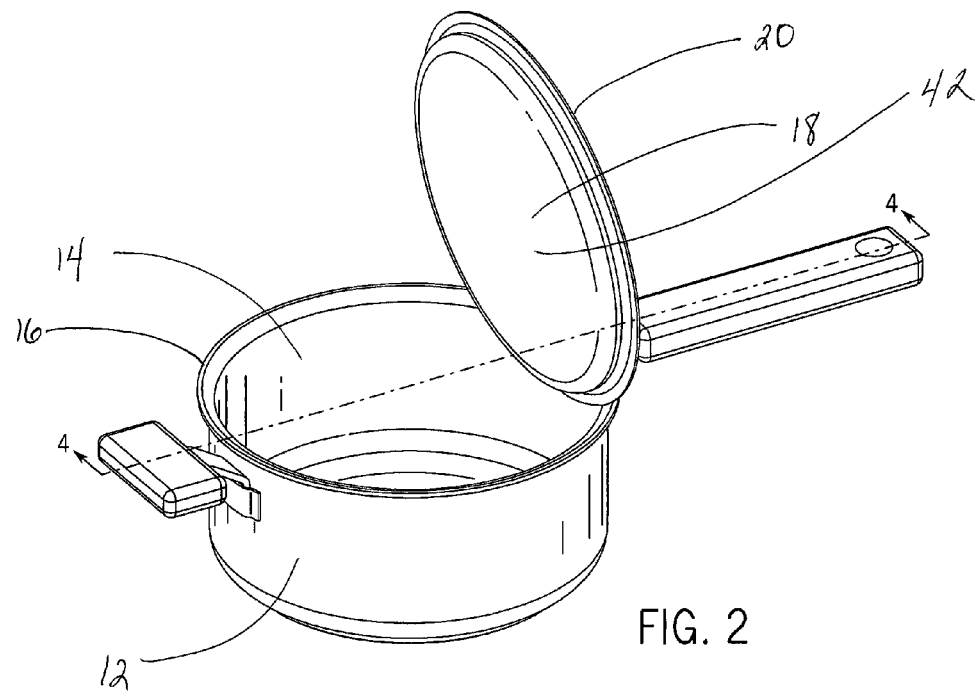
FIG. 2 is a perspective view of the cookvessel-lid-and-handle device and cookvessel of FIG. 1.

FIGS. 2-4 illustrate that offset handle member 22 is configured to suspend cookvessel-lid-and-handle device 10 on the rim 16 above the open top 14 of cookvessel 12. Protrusion 28 is configured and positioned to suspend lid 18 in a first near-vertical orientation 34 such that, when cookvessel-lid-and-handle device 10 is suspended over the open top 14 of cookvessel 12 the lid edge 20 defines a near-vertical plane 36 and a portion of the lid edge 20 is below the rim 16 of cookvessel 12 as seen in FIGS. 2-4. FIG. 3 illustrates the near-vertical plane 36 the lid edge 20 defines when device 10 is suspended over the open top 14 of cookvessel 12.

FIGS. 3 and 4 illustrate that a lower portion 44 of the rim 16 is over the open top 14 of cookvessel 12. Oftentimes during the cooking process condensation or food accumulates on the underside 42 of lid main portion 18. The near-vertical orientation allows the condensation or other matter that has collected to drip back into cookvessel 12 when lid main portion 18 is suspended by cookvessel-lid-and-handle device 10 above cookvessel 12.

Additionally, this orientation eliminates the mess that is caused when lid 18 would otherwise be placed on a counter top or other surface and it also provides a safe place for the user to put a hot lid 18 while cooking. This allows the user to have both hands available for cooking.

FIG. 4, taken along line 4-4 in FIG. 2, illustrates that in a first near-vertical orientation 34 a portion of lid edge 20 is below the rim 16 of cookvessel 12. FIG. 4 also illustrates that handle-connecting portion 32 is positioned to engage the top 46 of rim 16 if cookvessel-lid-and-handle device 10 moves from its first near-vertical orientation 34 toward a vertical orientation. This orientation facilitates maintenance of cookvessel-lid-and-handle device 10 in first near-vertical orientation 34.

FIGS. 5 and 6 illustrate cookvessel-lid-and-handle device 10 includes gripping portion 26. It should be noted that FIGS. 1-8 show one embodiment of gripping portion 26. Gripping portion 26, however, is not limited to being rectangular in shape. Gripping portion 26 can be many different shapes, including but not limited to, round, rectangular, spherical or square.

FIGS. 7 and 8 illustrate that cookvessel-lid-and-handle device 10 may be placed on a horizontal surface 38. First end 24 of offset handle member 22 and the adjacent edge of lid main portion 18 are configured and positioned to support cookvessel-lid-and-handle device 10 on a horizontal surface 38 in a second near-vertical orientation 40 which is beyond vertical with respect to first near-vertical orientation 34. FIGS. 7-8 show that cookvessel-lid-and-handle device 10 is tipped slightly backwards in second near-vertical orientation 40 in comparison to first near-vertical orientation 34 shown in FIGS. 3 and 4.

FIGS. 1-8 illustrate one embodiment of the invention. However, it should be noted that there are various embodiments to the present device which allow cookvessel-lid-and-handle device 10 to accommodate a wide range of cookvessel shapes and sizes as well as a wide range of cookvessel lids. There are numerous different handle and knob designs utilized in the cookware industry, such as, for example, strap-style handles which can be riveted to a vessel lid and to the side of the cookvessel itself. In order to accommodate the many different styles of handles in the cookware industry, the present device can be modified to accommodate any of a wide variety of vessels, handles or lid handle/knob designs. The various embodiments of the present device are not limited by this disclosure and would be well known to those skilled in the art of cookware and related devices.

Cookvessel-lid-and-handle device 10 can be made of a cast or injection-molded, heat-resistant plastic or various types of metal for added durability.

A wide variety of materials are available for the various parts discussed and illustrated herein. While the principles of this device have been described in connection with specific embodiments, it should be understood clearly that these descriptions are made only by way of example and are not intended to limit the scope of the device.

The invention claimed is:

1. In combination, a cookvessel having an open top surrounded by an outwardly projecting rim and a cookvessel-lid-and-handle device for temporary suspension above the open top of a cookvessel, the cookvessel-lid-and-handle device comprising:
   a lid main portion having an edge; and
   an offset handle member above the lid main portion and having (a) a first end adjacent to and spaced above the edge, (b) a gripping portion extending from the first end to a position over the lid main portion, (c) a protrusion extending toward the lid main portion and engageable with the underside of the rim, the protrusion is configured and positioned to suspend the lid in a first near-vertical orientation such that, when the cookvessel-lid-and-handle device is suspended over the open top of the cookvessel the edge of the lid defines a near-vertical plane, and (d) a handle-connecting portion extending between the gripping portion and the lid main portion the handle-connecting portion is positioned to engage the top of the rim if the cookvessel-lid-and-handle device moves from its first near-vertical orientation toward a vertical orientation, thereby facilitating maintenance of first near-vertical orientation,
   whereby the first end of the offset handle member and the adjacent edge of the lid main portion are configured and positioned to support the cookvessel-lid-and-handle device on a horizontal surface in a second near-vertical orientation which is beyond vertical with respect to the first near-vertical orientation and the offset handle member is configured to suspend the cookvessel-lid-and-handle device on the rim above the open top of the cookvessel.

2. The combination of claim 1 wherein when the cookvessel-lid-and-handle device is suspended over the open top of the cookvessel a portion of the edge is below the rim of the cookvessel.

3. The combination of claim 1 wherein the offset handle member is a heat-resistant plastic.

4. The combination of claim 1 wherein the offset handle member is metal.

* * * * *